United States Patent [19]

Lineberger

[11] Patent Number: 5,219,413
[45] Date of Patent: Jun. 15, 1993

[54] ENGINE IDLE SHUT-DOWN CONTROLLER

[75] Inventor: Timothy L. Lineberger, Mount Holly, N.C.

[73] Assignee: Carolina Tractor, Charlotte, N.C.

[21] Appl. No.: 757,845

[22] Filed: Sep. 11, 1991

[51] Int. Cl.⁵ .................. B60K 28/00; B60Q 9/00; F02M 3/00
[52] U.S. Cl. .................. 180/272; 340/457.3; 340/500; 123/339
[58] Field of Search ............. 340/666, 667, 565, 457, 340/457.3, 500, 501; 180/272, 273; 280/732, 734, 735; 123/339

[56] References Cited

U.S. PATENT DOCUMENTS

| | | | |
|---|---|---|---|
| 15,764 | 12/1886 | Griffin | 123/198 B |
| Re. 33,027 | 8/1989 | Danno et al. | 123/339 |
| 1,442,311 | 1/1923 | Watson | 123/198 B |
| 1,442,312 | 1/1923 | Watson | 123/198 B |
| 1,854,868 | 4/1932 | Talkes et al. | 123/634 |
| 2,031,139 | 2/1936 | Ury | 123/198 B |
| 2,151,069 | 3/1939 | Golden | 180/272 |
| 2,580,080 | 12/1951 | Dewhirst | 123/198 B |
| 4,016,428 | 4/1977 | Gutterman | 340/565 X |
| 4,178,580 | 12/1979 | Dombrowski | 340/457 |
| 4,381,042 | 4/1983 | Perry | 180/272 |
| 4,607,199 | 8/1986 | Krueger et al. | 180/273 |
| 4,636,774 | 1/1987 | Galvin et al. | 340/565 |
| 4,757,304 | 7/1988 | Rho | 340/522 |
| 4,883,034 | 11/1989 | Yashiki et al. | 123/339 |
| 4,892,167 | 1/1990 | Tejeda | 180/287 |
| 5,074,583 | 12/1991 | Fujita et al. | 280/735 |
| 5,118,134 | 6/1992 | Mattes et al. | 280/735 |

OTHER PUBLICATIONS

Caterpillar ®, Systems Operation Testing and Adjusting, 3176 Diesel Truck Engine Form SENR3909-01, Cover Page and p. 16.

Caterpillar ®, Schematic, 3176 Diesel Truck Engine Form No. SENR3912-03, (For Use In Service Manual 3176 Diesel Engine).

Alarm Controls Corporation, Installation Instructions Universal Timer Model UT-1, pp. 1 and 2.

Primary Examiner—Russell D. Stormer
Assistant Examiner—Florian Zeender
Attorney, Agent, or Firm—Bell, Seltzer, Park & Gibson

[57] ABSTRACT

A controller for preventing unnecessary idling of a vehicle engine, such as when the vehicle is left unattended with the engine idling. The controller includes a motion detector having a predetermined detection pattern directed to the driver's position within the vehicle. The motion detector is preferably a passive infrared motion detector. When the motion detector fails to detect the presence of the driver for a preselected time, the engine is shut down by a control circuit. The engine idle shut-down controller may also include various sensors, such as a vehicle speed sensor, and engine load and temperature sensors, to determine that the vehicle is not moving before shutting down the engine.

14 Claims, 1 Drawing Sheet

ENGINE IDLE SHUT-DOWN CONTROLLER

FIELD OF THE INVENTION

This invention relates to the field of vehicle engine controls, and more particularly to a controller and a method for preventing unnecessary idling of a vehicle engine.

BACKGROUND OF THE INVENTION

Despite improvements in modern diesel trucks, in terms of starting ease and drivability during engine warm-up, many diesel truck drivers are still in the habit of leaving their trucks idling unattended for extended periods. This habit apparently stems from prior generations of diesel truck engines that were difficult to restart after being shut down for an extended time period. Thus, the truck may sit idling for a half-a-day or longer while fuel is unnecessarily consumed and the engine and other components experience unnecessary wear. Much of the idling is unnecessary and occurs while the driver has left the truck unattended with the engine idling, often for extended time periods, as when stopping for meals or other breaks.

A typical diesel truck engine may consume 1 to 1.5 gallons of diesel fuel per hour while idling, in comparison to a typical fuel consumption of about 6 to 21 gallons per hour while the truck is operating on the road. Depending on the particular driver, a large portion of the fuel consumed, and the wear on the engine and other related mechanical components, occur during unnecessary idling.

Presently, unnecessary idling of a vehicle engine may be prevented by using an engine idle sensor and a mechanical timer cooperating with the sensor to shut off the engine after the engine has idled for a predetermined time period. For example, U.S. Pat. No. 15,764 (Dec. 2, 1886) to Griffin discloses a gas cutoff valve and spring clock connected to the gas cutoff for stopping an engine after a predetermined time.

Similarly, U.S. Pat. Nos. 1,442,311 and 1,442,312, both to Watson, disclose timers for interrupting the idling of truck engines in particular, to thereby economize the consumption of fuel and to save wear on the engine and other components. These two patents disclose various mechanical approaches to activating a clocktrain which times out and interrupts the ignition circuit after a predetermined idling time. As described in U.S. Pat. No. 1,442,312, before the advent of automatic starters, "unnecessary" idling of an engine was quite common. U.S. Pat. No. 2,580,080 to Dewhirst discloses sensing a lower oil pressure occurring during engine idling to initiate a timer for shutting down the idling engine.

The parking brake may also be used to trigger a timer for shutting down an idling engine after a predetermined time. For example, U.S. Pat. No. 2,031,139 to Ury discloses a device for stopping the idling engine of a truck after a predetermined period wherein a clock timer is activated when the emergency or parking brake is applied. Similarly, U.S. Pat. No. 1,854,868 to Talkes et al. discloses an ignition cutoff using an electric heater, bimetallic strip, and thermostat to perform the timing function, the initiation of the timer being triggered by the emergency brake.

Truck engines in particular are likely to be left unnecessarily idling for an extended period. Accordingly, many modern diesel trucks are equipped with electronic engine control systems that include sensors that may sense idling of the engine. In an attempt to prevent unnecessary idling, the electronic engine controls may also include an engine idle shut-down system that initiates a timer responsive to the driver applying the parking brake. The engine is shut down a predetermined time after the parking brake has been applied.

Unfortunately, many drivers are aware that the engine idle shut-down may be readily bypassed by simply not applying the parking brake. The driver may chock the truck wheels and avoid using the parking brake, or worse, the driver may simply conclude that parking on a level surface is all that is needed to prevent a run-away truck. The parking brake approach to initiate idle shut down may unintentionally serve as a deterrent to safety, by encouraging a driver to avoid using the parking brake. It is also possible that the driver, through inadvertence, may fail to apply the parking brake. Whether the driver intentionally bypasses the idle shut-down or simply forgets to apply the parking brake, the undesirable adverse effects on overall fuel economy and engine wear are the same.

OBJECT AND SUMMARY OF THE INVENTION

It is therefore an object of the present invention to provide an improved engine idle shut-down controller for preventing unnecessarily idling of a vehicle engine to thereby reduce unnecessary engine wear and fuel consumption. In addition, the engine shut-down controller is compatible with existing modern electronic engine control systems and may be used to prevent bypassing of a vehicle's parking brake activated switch.

This and other objects of the present invention are provided by an engine shut-down controller for preventing unnecessary idling of a vehicle engine, such as when a driver leaves the vehicle for an extended time with the engine idling. The shut-down controller includes a detector for detecting the driver's presence in the driver's position in the vehicle and a control circuit responsive to the detector. The control circuit provides a means for shutting down the engine after the presence of the driver is no longer detected by the detector. The engine may be shut down by stopping fuel delivery to the engine or by stopping the engine ignition by conventional means.

In a preferred embodiment of the invention, the detector is a passive infrared detector which has a detection zone directed to the driver's position within the vehicle. The driver will typically be cooler or hotter than the background. Accordingly, the infrared detector may detect movement of the driver by detecting changes in the received infrared energy pattern caused by movement of the driver, such as during the driver's normal operation of the vehicle.

The engine shut-down controller also preferably includes a timer with a selectable time delay for delaying shut down of the engine until a preselected time has elapsed since motion of the driver was last detected. Other safety features may also be incorporated into the engine shut-down controller. Engine speed may be monitored to ensure the vehicle speed is zero before shutting down the engine. Engine loading and temperature may also be sensed to ensure that the engine is not moving before the engine is shut down.

The engine shut-down controller may be readily adapted to interface and function with a modern electronic engine control system. Some modern engine control systems include a parking brake activated switch which will cause the engine to shut down a predetermined time after the parking brake has been applied. According to one aspect of the invention, the engine idle shut-down controller may be connected in parallel with the parking brake switch contacts. Thus, even if the driver fails to engage the parking brake, the motion detector will detect the absence of the driver and will cause shut down of the engine.

DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiment set forth herein. Rather, applicant provides this embodiment so that this disclosure will be thorough and complete, and will fully convey the scope of the invention to those skilled in the art.

Figure 1:
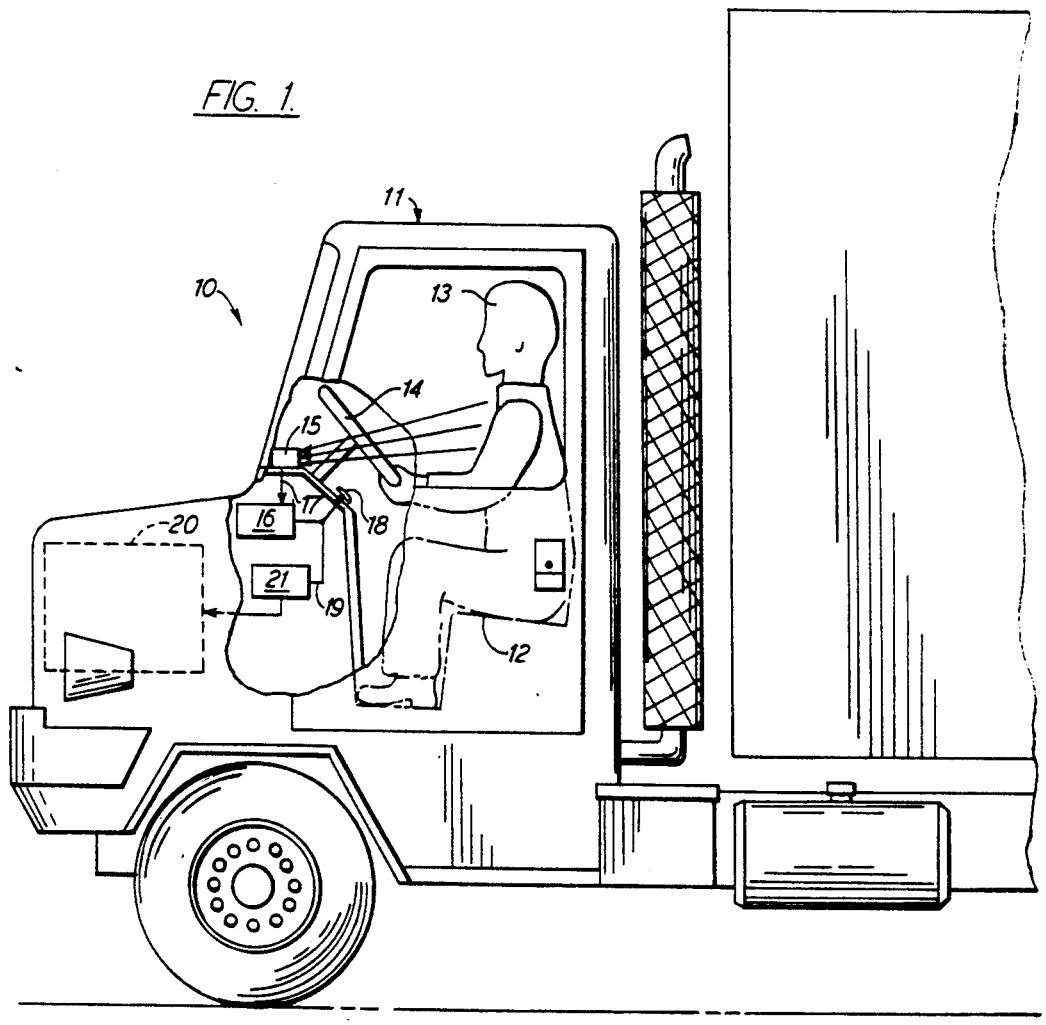
FIG. 1 is a schematic view of an engine idle shut-down controller according to the invention installed in a truck.

Referring to FIG. 1 there is shown schematically, the components of the engine shut-down controller 10 according to the invention installed in a truck 11. The truck includes a driver's seat 12 defining a driver's position within the truck 11. During normal operation of the truck 11, the driver 13 sits in the driver's seat 12 and must exercise manual control of the steering wheel 14 and also typically a gear shift, not shown. The driver's normal movements in driving the truck 11 are readily detectable by a passive infrared motion detector 15 which may be positioned on the truck dashboard, as shown, or in other areas within the truck as along as the zone of detection is directed to the driver's position within the truck. As would be readily understood by those skilled in the art, the engine idle shut-down controller 10 may be used in other Vehicles and its use is not limited to trucks. For example, the shut-down controller 10 may be used in construction equipment, passenger cars, busses, and the like.

The passive infrared motion detector 15 provides one means for detecting the presence of the driver 13 in the driving position. As would be readily understood by those skilled in the art, other means may also be provided to detect the presence of the driver 13 in the driving position. For example, an ultrasonic motion detector may be used. Detectors sensitive to wavelengths other than infrared may also be used. In addition, an active system including a transmitter to illuminate the driving position and an associated detector may also be used. Another means for detecting the presence of the driver 13 includes one or more pressure sensitive switches associated with the driver's seat 12. However, pressure switches may possibly be bypassed by the driver 13 by placing a suitable weight in the driver's seat 12 upon leaving the truck 11.

The passive infrared motion detector 15 is responsive to changes in infrared energy and is preferably of the type of detector commonly found in commercial and home security applications, or for automatic door opening applications, etc. The passive infrared detector 15 may be a model SPY series detector as available from Visonic Ltd. (USA) in Bloomfield, Conn. The infrared motion detector 15 may include a generally cylindrical housing with a lens and mounting flange at one end, and the wire leads exiting the housing at the opposite end. The detector 15 has a predetermined detection zone which is directed to the driver's position within the truck 11.

In the illustrated embodiment, the infrared motion detector 15 is connected to a timer/interface circuit 16 by a cable or wire 17. The timer/interface circuit 16 comprises the control means for shutting down the idling engine after the driver's presence in the truck 11 is no longer detected. The timer/interface circuit 16 may be a Universal Timer Model UT-1 sold by Alarm Controls Corporation of Deer Park, N.Y. The timer/interface circuit 16 provides a selectable timing delay so that the engine 20 may be shut down after the driver's presence 13 has not been detected for a preselected time. The preselected time delay may preferably be about 10 minutes. In addition, the timer/interface circuit 16 provides the desired output interface, such a normally opened or normally closed contact outputs.

In the illustrated embodiment, the timer/interface circuit 16 may be added in a retrofit application to an existing electronic engine control system 21. The electronic engine control system 21 may include a number of sensors and logic functions to ensure that the engine 20 is not inadvertently shut down during normal operation of the truck 11 as is explained in greater detail below. As shown in the illustrated embodiment, a parking brake activated switch 18 is connected to the electronic engine control 21 by a cable or wires 19 to initiate an integral timer 23 within the electronic engine control system 21. The integral timer 23 shuts down the engine 20 a predetermined time after the parking brake has been applied. As would readily be understood by those skilled in the art, the time delay of the timer/interface circuit 16 and the timer 23 integral to the electronic engine control system 21 may each be set at about five minutes to thereby provide an overall delay of ten minutes from the time the motion detector 15 last detects motion of the driver 13.

Unfortunately, some drivers will not apply the parking brake in order to leave the engine 20 idling, such as while stopping for a break or other reason. The driver 13 may chock the truck wheels to prevent the idling truck 11 from moving when on an incline. Moreover, the unnecessary idling wastes fuel and also causes wear on the engine 20 and related mechanical components. Accordingly, the engine idle shut-down controller 10 may be adapted to the parking brake switch 18 and existing electronic engine control system 21 to prevent bypassing of the parking brake switch 18.

The timer/interface circuit 16 of the present invention may be provided with a set of normally open contacts as an output. As shown in the schematic diagram of FIG. 2, the normally open contacts may be connected in parallel with the contacts of the parking brake switch 18. If the driver 13 attempts to bypass the parking brake activated switch 18 by not applying the parking brake, the infrared motion detector 15 and the timer/interface circuit 16 will produce a contact closure input to the electronic engine control system 21 just as if the parking brake switch 18 were activated. Thus, the present invention prevents bypassing of the idle shut-down feature of some existing electronic engine control systems 21. As would be readily understood by those skilled in the art, in other embodiments of the invention the motion detector 15 and the timer/interface circuit 16 may be integrated into an electronic engine control system 21 and the parking brake switch 18 may be deleted from the system.

Figure 2:
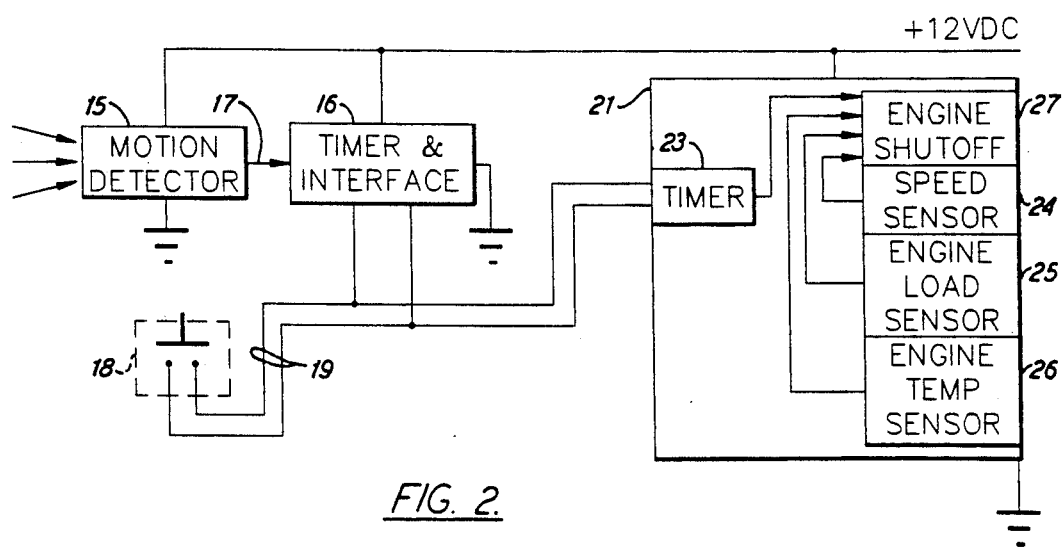
FIG. 2 is a schematic block diagram of the engine idle shut-down controller as shown in FIG. 1.

A typical electronic engine control system 21 may include a number of safety features as illustrated in the schematic diagram of FIG. 2. For example, an integral timer 23 is typically included. A vehicle speed sensor 24, an engine load sensor 25, and an engine temperature sensor 26 are often included and their outputs coupled to an engine shutoff circuit 27 which performs a series of logical functions to ensure that the engine 20 is not shut down when the truck 11 is moving. For a diesel engine 20, the engine shutoff circuit 27 may be connected to a conventional solenoid valve, not shown, which stops fuel delivery to the engine 20. An ignition cut-off may be provided for a gasoline engine. The engine 20 may only be shut down by the motion detector 15 and timer/interface circuit 16 under the following conditions: when the vehicle speed sensor 24 indicates a speed of zero; when the engine load sensor 25 indicates the engine is idling; when the temperature sensor 25 indicates that the engine is at normal operating temperature; or during any combination of these conditions. Thus, the engine shut-down controller 10 according to the invention will detect the absence of motion of the driver 13 as indicating that the engine 20 should be shut down after a preselected time to save fuel and prevent wear on the engine. If, however, the truck 11 is moving as determined by other independent sensors, the engine 20 will not be shut down. An additional margin of operating safety for the driver 13 and the public is thus provided.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An engine control system for preventing unnecessary idling of a vehicle engine when a driver leaves the driver's position within the vehicle with the engine idling, said engine control system comprising:
    a parking brake switch responsive to application of a parking brake of the vehicle;
    an electronic engine controller cooperating with said parking brake switch for shutting down the idling engine a predetermined time after application of the parking brake;
    a motion detector for detecting a driver's presence in the driver's position of the vehicle based upon the driver's normal movements in the driver's position during the driver's operation of the vehicle, said motion detector having a predetermined detection zone being directed to the driver's position; and
    control means responsive to said motion detector and cooperating with said electronic engine controller for shutting down the idling engine after said motion detector no longer detects the presence of the driver in the driver's position;
    whereby the driver is encouraged from intentionally failing to engage the parking brake in an effort to let the vehicle engine idle when leaving the vehicle, and whereby the idling engine is also shutdown if the driver accidentally fails to engage the parking brake.

2. An engine control system according to claim 1 wherein said motion detector comprises an infrared motion detector.

3. An engine control system according to claim 1 wherein said electronic engine controller includes means for sensing vehicle speed and for shutting down the engine if the vehicle speed is zero, to thereby prevent engine shut down while the vehicle is moving.

4. An engine control system according to claim 1 wherein said electronic engine controller includes means for sensing engine load and for shutting down the engine if the engine load is at a predetermined value indicative of engine idling, to thereby prevent engine shut down while the vehicle is moving.

5. An engine control system according to claim 1 wherein said electronic engine controller includes means for sensing engine load and engine temperature and for shutting down the engine if the engine load and temperature are at respective predetermined values indicative of engine idling, to thereby prevent engine shut down when the vehicle is moving.

6. An engine control system according to claim 1 wherein said control means includes a timer having a selectable time delay for shutting down the idling engine a preselected time after presence of the driver in the driver's position is last detected by said motion detector.

7. An engine control system according to claim 1 wherein said electronic engine controller includes means for stopping at least one of fuel delivery to the engine and engine ignition to shut down the engine.

8. An engine control system for preventing unnecessary idling of a vehicle engine when a driver leaves the driver's position within the vehicle with the engine idling, said engine control system comprising:
    a parking brake switch responsive to application of a parking brake of the vehicle, said parking brake switch comprising a set of normally open contacts;
    an electronic engine controller cooperating with said parking brake switch for shutting down the idling engine a predetermined time after application of the parking brake;
    a motion detector for detecting a driver's presence in the driver's position of the vehicle based upon the driver's normal movements in the driver's position during the driver's operation of the vehicle, said motion detector having a predetermined detection zone being directed to the driver's position; and
    control means responsive to said motion detector and including a set of contacts connected in parallel with said normally open contacts of said parking brake switch for shutting down the idling engine after said motion detector no longer detects the presence of the driver in the driver's position;
    whereby the driver is encouraged from intentionally failing to engage the parking brake in an effort to let the vehicle engine idle when leaving the vehicle, and whereby the idling engine is also shutdown if the driver accidentally fails to engage the parking brake.

9. An engine control system according to claim 8 wherein said motion detector comprises an infrared motion detector.

10. An engine control system according to claim 8 wherein said electronic engine controller includes means for sensing vehicle speed and for shutting down the engine if the vehicle speed is zero, to thereby prevent engine shut down while the vehicle is moving.

11. An engine control system according to claim 8 wherein said electronic engine controller includes means for sensing engine load and for shutting down the engine if the engine load is at a predetermined value indicative of engine idling, to thereby prevent engine shut down while the vehicle is moving.

12. An engine control system according to claim 8 wherein said electronic engine controller includes means for sensing engine load and engine temperature and for shutting down the engine if the engine load and temperature are at respective predetermined values indicative of engine idling, to thereby prevent engine shut down when the vehicle is moving.

13. An engine control system according to claim 8 wherein said control means includes a timer having a selectable time delay for shutting down the idling engine a preselected time after presence of the driver in the driver's position is last detected by said motion detector.

14. An engine control system according to claim 8 wherein said electronic engine controller includes means for stopping at least one of fuel delivery to the engine and engine ignition to shut down the engine.

* * * * *

UNITED STATES PATENT AND TRADEMARK OFFICE
CERTIFICATE OF CORRECTION

PATENT NO.   : 5,219,413
DATED        : June 15, 1993
INVENTOR(S)  : TIMOTHY L. LINEBERGER It is certified that error appears in the above-identified patent and that said Letters Patent is hereby corrected as shown below:

Column 3, line 45, delete "Vehicles" and substitute --vehicles-- therefor.

Column 5, line 66, delete "encouraged" and substitute --discouraged-- therefor.

Column 6, line 58, delete "encouraged" and substitute --discouraged-- therefor.

Signed and Sealed this

First Day of March, 1994

Attest:

BRUCE LEHMAN

Attesting Officer      Commissioner of Patents and Trademarks